(12) United States Patent
Miller

(10) Patent No.: US 6,186,473 B1
(45) Date of Patent: Feb. 13, 2001

(54) TAP

(75) Inventor: Ian Allan Miller, Clovelly Park (AU)

(73) Assignee: Caroma Industries Limited, Brisbane (AU)

( * ) Notice: Under 35 U.S.C. 154(b), the term of this patent shall be extended for 0 days.

(21) Appl. No.: 09/405,417

(22) Filed: Sep. 24, 1999

(30) Foreign Application Priority Data

Sep. 28, 1998 (AU) .................................................. PP6205

(51) Int. Cl.$^7$ .................................................. F16K 31/44
(52) U.S. Cl. ........................ 251/215; 251/128; 251/214
(58) Field of Search .................................. 251/215, 214, 251/218, 219, 128, 291, 900

(56) References Cited

U.S. PATENT DOCUMENTS

| | | | |
|---|---|---|---|
| 3,820,564 | * | 6/1974 | Wagner ................................. 251/214 |
| 6,095,494 | * | 8/2000 | Egale .................................... 251/215 |
| 6,112,368 | * | 9/2000 | Luckett ................................. 251/215 |

FOREIGN PATENT DOCUMENTS

WO98/12460   3/1998   (WO) .

* cited by examiner

Primary Examiner—Kevin Shaver
Assistant Examiner—David A. Bonderer
(74) Attorney, Agent, or Firm—Merchant & Gould P.C.

(57) ABSTRACT

A tap has a hollow body (6) having an interior threaded portion (18) and (9). A manually turnable spindle (7) having an exterior threaded portion (19) is threadably engaged with the interior treaded portion (18) to advance and retract to spindle (7) relative to the tap body (6) to respectively close and open the tap. A seal (28) seals the spindle (7) relative to the hollow body (6). A locking mechanism including mutual abutent portions (27, 13) on the body (16) and spindle (7) to limit the retraction of the spindle (7). The relative lengths of the threaded portions (18, 19) and the relative locations of the mutual abutment portions (27, 13) are selected so that continued turning of the spindle (7) in the retraction direction disengages the threaded engagement prior to abutment of the mutual abutment portions (27, 13).

5 Claims, 4 Drawing Sheets

TAP

FIELD OF THE INVENTION

The present invention relates to taps and, in particular to a tap having a substantially vandal-proof spindle.

BACKGROUND OF THE INVENTION

Water taps conventionally have a tap body including a valve seat, and a tap spindle which is able to be advanced or retraced relative to said tap body so u to advance a jumper washer into, or retract it from, engagement with the valve seat to respectively close and open the tap.

When the tap is closed, compression of the jumper valve prevents further rotation of the tap spindle in the tap closing direction. A locking device of some kind is provided to prevent continued rotation of the spindle in the tap opening direction. Generally an abutment of some kind is provided between a portion on the tap spindle and a portion on the tap body which prevents further rotation of the tap spindle.

Unfortunately many water taps in public places such as public lavatories, parks, and the like are subject to attack by vandals. In particular, vandals often turn the tap fully on and then, using both hands, apply a maximum possible opening torque to the tap handle. This generally results in either one of two eventualities. The first eventuality is that the tap spindle shears and the tap handle comes away thereby permanently damaging the tap and making it difficult for the flow of water from the open tap to be turned off subsequently by a lavatory attendant, park maintenance officer, or similar public official. This is the lesser of two evils since although the tap is turned fully on, at least the water is directed to flow out the spout of the tap.

The other eventuality is that the tap body is fabricated in two parts and the torque transmitted via the spindle to the upper part of the tap body is sufficient to cause the upper part of the tap body to rotate. Continued rotation in the tap opening direction is then sufficient to cause the upper part of the tap body to disengage from the valve seat. As a consequence, the entire upper part of the tap body is lost by being stolen by the vandal, and water under mains pressure shoots upwardly from the valve seat, thereby causing damage to ceilings, light fittings, and the like.

The object of the present invention is to provide a tap body and spindle arrangement which will substantially overcome, or at least ameliorate, the abovementioned vandal induced damage to conventional taps.

The present invention was covered accidentally as a result of the work done in placing the invention described in the specification of international patent application no PCT/AU97/00620 in the name of the present applicant, into practise. The entire contents of the abovementioned international patent application are hereby incorporated into the present specification by means of cross reference.

When the first off-tool samples of the tap described in the abovementioned international patent specification were received by the present applicant, it was noticed that because the material of the tap body and spindle, being predominantly plastics, was relatively soft, that item excessive turning of the tap spindle in the tap opening direction was sufficient to cause deformation of the moulded plastics components leading to permanent damage. This is essentially because the threaded engagement between the spindle and tap body provides a substantial mechanical advantage in converting rotational force applied to the tap spindle into a translational force extending in the direction of the axis of rotation of the tap spindle.

However, in relation to the embodiments of the tap illustrated in FIGS. 8 and 9 of the abovementioned international patent specification, and which are provided with a locking collar 62 or 72 which threadably engages with the tap body, in unusual circumstances a very unusual result was able to be achieved. These unusual circumstances were that (i) the locking collar was only just threadably engaged with the tap body, and (ii) instead of continuing to rotate the locking collar 62 or 72 so as to complete the assembly of the tap, (iii) the spindle 7 was then turned to a maximum extent in the tap opening direction, it was discovered that the threaded portions 18 and 19 disengaged and the spindle 7 freewheeled prior to causing any damage to either the spindle, the locking collar or the body. Only when this happenstance occurred, did the present invention come to be grasped and its significance be realised.

SUMMARY OF THE INVENTION

In accordance with a first aspect of the present invention there is disclosed a tap including a hollow body having an interior threaded portion; a manually turnable spindle having an exterior threaded portion threadably engaged with said interior threaded portion to advance and retract said spindle relative to said tap body to respectively close and open said tap; sealing means to seal said spindle relative to said hollow body; and a locking means comprising mutual abutment portions on said body and spindle to limit the retraction of said spindle, wherein the relative lengths of said the portions and the relative locations of said mutual abutment portions are selected so that continued turning of said spindle in the retraction direction disengages said threaded engagement prior to abutment of said mutual abutment portions.

In accordance with a second aspect of the present invention there is disclosed a method of preventing tap vandalism.

BRIEF DESCRIPTION OF THE DRAWINGS

Two embodiments of the present invention will now be described with reference to the drawings in which.

DETAILED DESCRIPTION OF THE PREFERRED EMBODIMENTS

Figure 1:
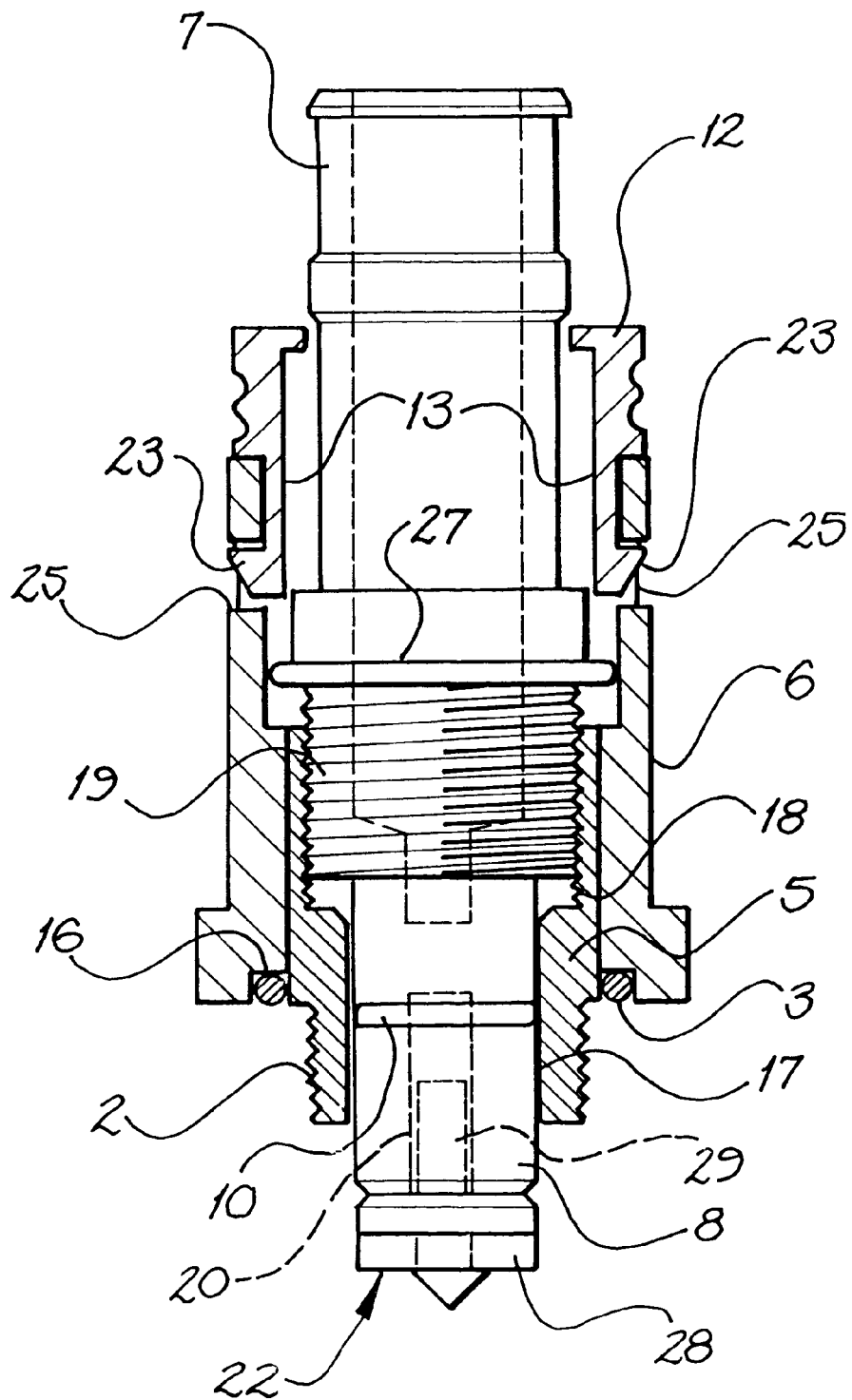
FIG. 1 is a longitudinal cross-section through a tap and reproduces FIG. 4 of the abovementioned international patent specification, the tap spindle being only partially

In the description which follows the same reference numerals are used for the same parts as in the abovementioned international patent specification.

As explained in the abovementioned international patent specification, the tap of FIG. 1 has a mounting spigot 2 which carries a scaling O-ring 3 so as to provide a watertight seal between the tap body or shroud 6 and the tap seat (not illustrated). A spindle 7 is located within the tap body and has a valve carrier 8 at one (lower) end into which an O-ring 10 is received. The opposite end of the spindle 7 is ultimately connected to the handle (not illustrated) of the tap. The O-ring 10 travels with the spindle 7 up and down inside a smooth bore 17 so as to provide a seal between the spindle 7 and the tap body.

A locking collar 12 having a pair of opposed legs 13, 14 is snap-engagable with the tap body. The legs 13 of the locking collar 12 include cam wedges 23 which snap engage into rectangular openings 25 in the tap body. In order to prevent rotation of the spindle 7 in the tap open direction inadvertently removing the tap spindle 7 from the tap body, an outer peripheral lip 27 on the spindle 7 engages with the distal ends of the legs 13 to limit the movement of the spindle 7 in the tap opening direction.

Figure 2:
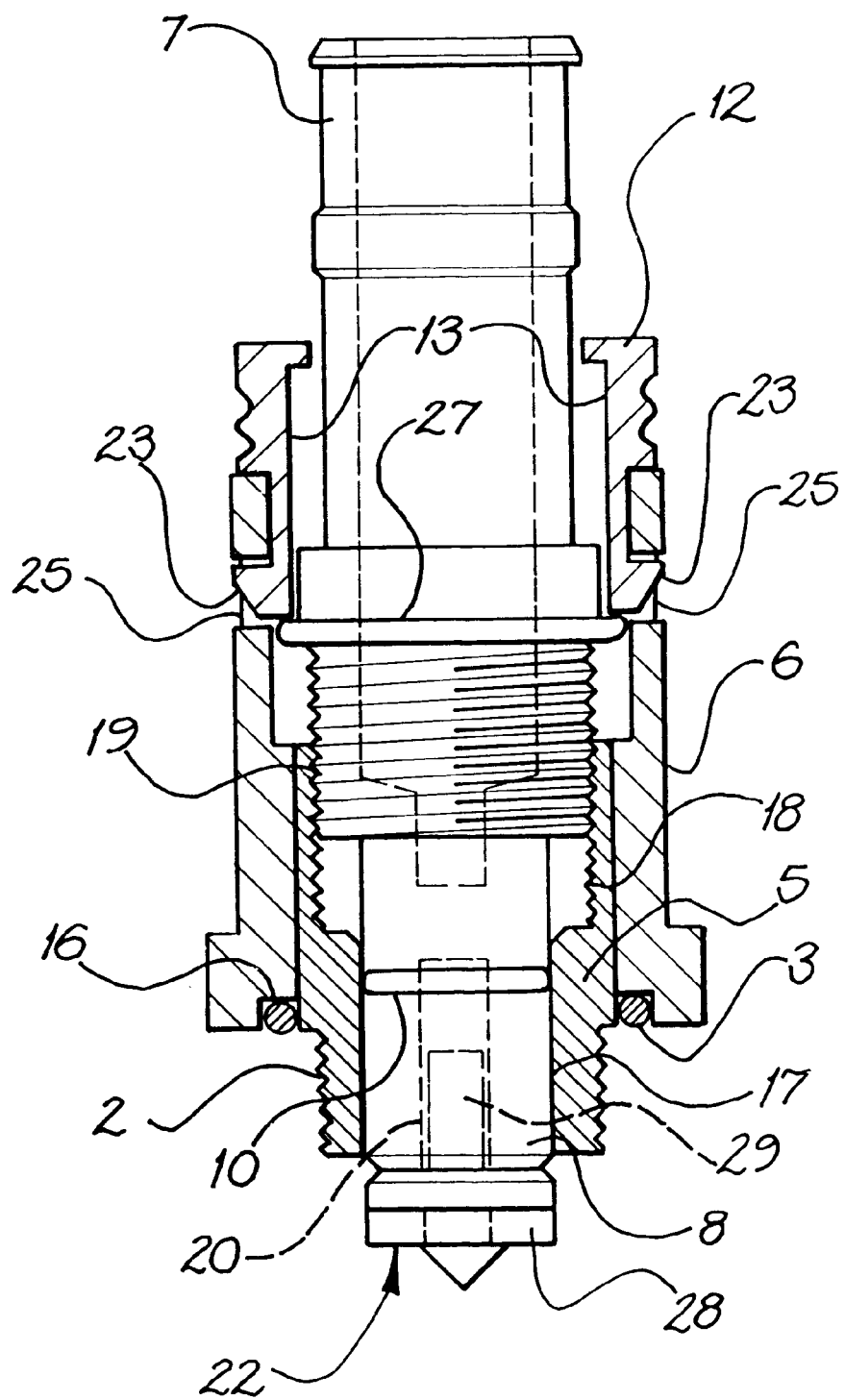
FIG. 2 is a view similar to FIG. 1 but showing the tap spindle fully retracted.

This is the position illustrated in FIG. 2 where the spindle 7 has been turned so as to retract the spindle relative to the mid-range position illustrated in FIG. 1. It will be appreciated that in FIG. 2 the threaded portion 18 of the tap body is still engaged with the threaded portion 19 of the spindle 7 and therefore considerable force can be exerted by the outer peripheral lip 27 on the legs 13. This force can be sufficient to cause the mounting spigot 2 to rotate relative to the valve seat, so that continued rotation of the spindle 7 to causes the tap body to rotate and be removed from the valve seat. Alternatively, sufficient force can be exerted on the components so as to distort and permanently damage same.

Figure 3:
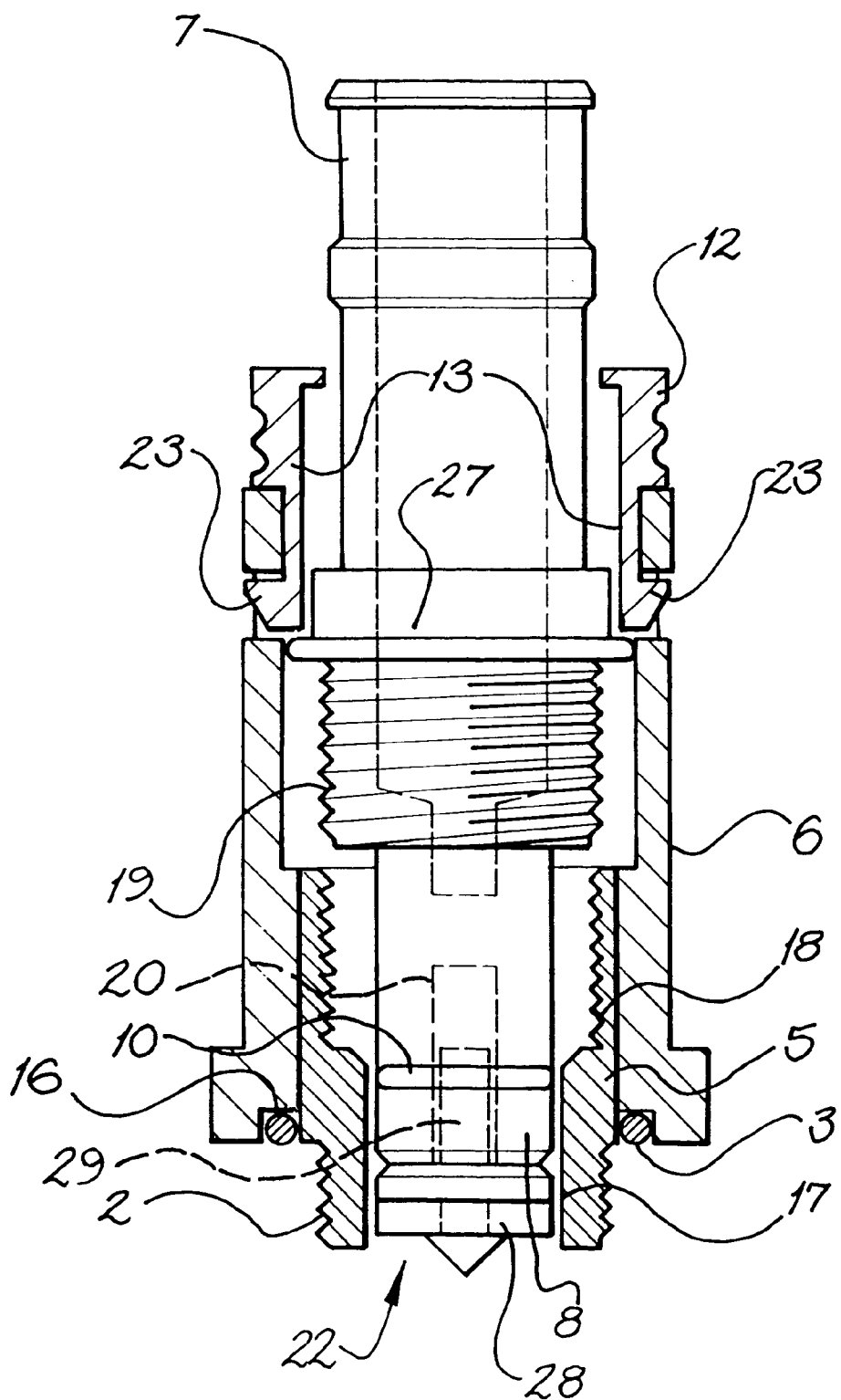
FIG. 3 is a longitudinal cross-sectional view similar to FIGS. 1 and 2 but illustrating the modified tap arrangement of the first embodiment of the present invention.

FIG. 3 illustrates the modification required to the arrangement of FIGS. 1 and 2 in order to put the present invention into practise. Here the tap body in the form of shroud 6 is lengthened so that with the spindle 7 turned into the maximum retraction position as illustrated in FIG. 3, the threaded portion 19 of the spindle 7 is disengaged from the threaded portion 18 of the tap body. As a consequence, although the outer peripheral lip 27 on the spindle 7 can touch the legs 13, no force is exerted on the legs 13, there is no distortion of the body parts and the spindle 7 can freewheel. As a consequence, although a vandal can turn the tap on, continued opening of the tap does not result in any breakage and the spindle can be re-engaged with the tap body simply by turning the pile 7 in the tap closing direction.

It will be apparent to those skilled in the art that a similar result can be achieved by shortening the length of the externally threaded portion 19.

In addition, it is necessary to ensure that the O-ring 10 which maintains the seal between the spindle 7 and the smooth bore 17 is repositioned as necessary to ensure that the O-ring 10 remains engaged with the smooth bore 17 even with the spindle 7 turned into the maximum tap open position illustrated in FIG. 3.

Figure 4:
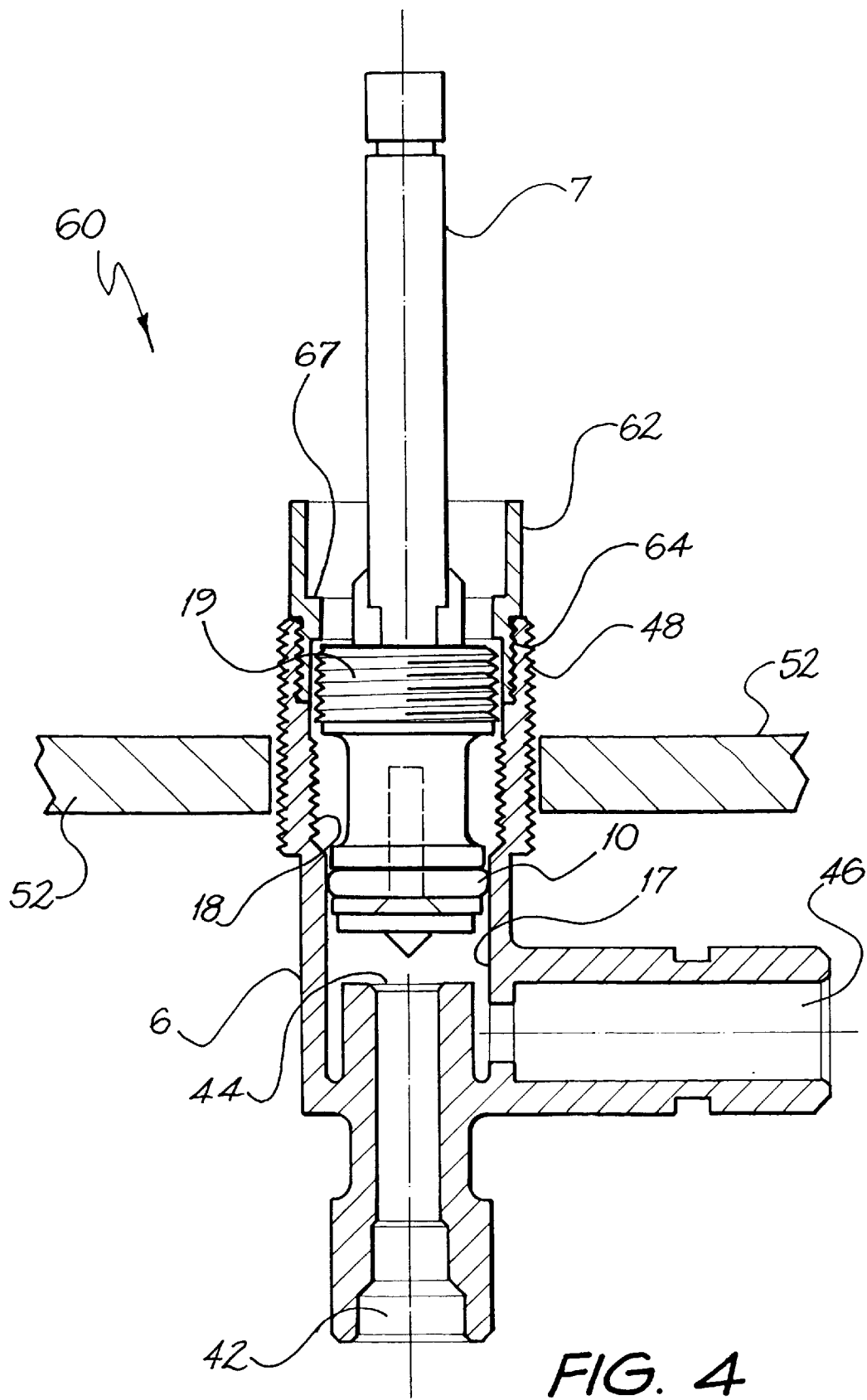
FIG. 4 is a longitudinal crosssectional view similar to FIG. 8 of the abovementioned international patent specification but illustrating the tap of the second embodiment of the present invention.

Turning now to FIG. 4, a second embodiment of the present invention is there illustrated with the designation numbers being the same as in FIG. 8 of the abovementioned international patent specification. In this embodiment the tap body 60 is intended for use in three-hole tap installations and is provided with an externally threaded locking collar 62 which engages a second interior threaded portion 64 provided on the tap end of the shroud 6. The collar 62 has an inner peripheral lip 67 which engages the shortened exterior threaded portion 19 on the spindle 7. This limits the movement of the spindle 7 in the tap opening direction.

As will be seen from FIG. 4, with spindle 7 turned into the maximum tap open position as illustrated, the threaded portion 19 engages the inner peripheral lip 67 but the threaded portion 19 has disgraced from the interior threaded portion 18 of the tap body. As a consequence, the spindle 17 freewheels and no force can be exerted onto the tap body by tang the tap handed 7. As before, the O-ring 10 remains engaged with the smooth bore 17 so as to ensure a seal between the spindle 7 and the tap body or shroud 6.

As before, rotation of the spindle 7 in the tap closing direction re-engages the threaded portions 18 and 19 so as to permit the spindle 7 to be advanced and retraction the normal fashion so as to respectively close and open the tap.

It will be apparent to those skilled in the art that the forgoing describes only some embodiments of the present invention and modifications, obvious to those skilled in the art can be made thereto without departing from the scope of the preset invention. In particular, the modifications required to each of the five embodiments of the tap body disclosed in the abovementioned international patent specification will be apparent to those skilled in the art, notwithstanding that only the modifications required to two of those embodiments had been specifically disclosed herein.

What is claimed is:

1. A tap including a hollow body having an interior threaded portion; a manually turnable spindle having an exterior threaded portion threadably engaged with said interior threaded portion to advance and retract said spindle relative to said tap body to respectively close and open said tap; sealing means to seal said spindle relative to said hollow body; and a locking means including mutual abutment portions on said body and spindle to limit the retraction of said spindle, wherein the relative lengths of said threaded portions and the relative locations of said mutual abutment portions are selected so that continued turning of said spindle in the retraction direction disengages said threaded engagement prior to abutment of said mutual abutment portions.

2. A tap as claimed in claim 1 wherein following disengagement of said threaded portions, turning said spindle in the advancement direction re-engages said threaded engagement.

3. A tap as claimed in claim 1 wherein said sealing means remains operative with said spindle retracted sufficiently to result in abutment of said mutual abutment portions.

4. A tap as claimed in claim 1 wherein said sealing means includes an O-ring carried by said spindle and travelling within a smooth bore of said hollow body.

5. A tap as claimed in claim 1 wherein said spindle freewheels following disengagement of said threaded portions.

* * * * *